(12) United States Patent
Nishio

(10) Patent No.: US 10,192,151 B2
(45) Date of Patent: Jan. 29, 2019

(54) PRINT CONTROL APPARATUS AND METHOD FOR EXECUTING A PRINT JOB UNDER DIFFERENT PRINT CONDITIONS

(71) Applicant: Seiko Epson Corporation, Tokyo (JP)

(72) Inventor: Satoru Nishio, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/410,379

(22) Filed: Jan. 19, 2017

(65) Prior Publication Data

US 2017/0255846 A1   Sep. 7, 2017

(30) Foreign Application Priority Data

Mar. 1, 2016   (JP) .................. 2016-038654

(51) Int. Cl.
   *G06K 15/10*   (2006.01)
   *G06K 15/02*   (2006.01)

(52) U.S. Cl.
   CPC ..... *G06K 15/1809* (2013.01); *G06K 15/1825* (2013.01); *G06K 15/1872* (2013.01); *G06K 15/1878* (2013.01)

(58) Field of Classification Search
   None
   See application file for complete search history.

(56) References Cited

U.S. PATENT DOCUMENTS

2007/0086057 A1*  4/2007  Kanada .................. G06F 3/1212
                                                         358/3.06
2010/0302597 A1* 12/2010  Sugiyama ............... G06K 15/02
                                                         358/3.27
2012/0075656 A1*  3/2012  Yasukawa ............. G06K 15/005
                                                         358/1.14
2015/0002863 A1*  1/2015  Kameda .................. G06F 3/125
                                                         358/1.2
2015/0178606 A1*  6/2015  Nakashio ........... G06K 15/1878
                                                         358/1.9
2015/0213343 A1   7/2015  Ono
2016/0019015 A1*  1/2016  Hirasawa .............. G06F 3/1205
                                                         358/2.1
2016/0086070 A1*  3/2016  Kikumoto ............ G06K 15/408
                                                         358/1.15

FOREIGN PATENT DOCUMENTS

JP    2013-186374 A   9/2013
JP    2015-142312 A   8/2015
JP    2016-021690 A   2/2016

* cited by examiner

*Primary Examiner* — Henok Shiferaw
(74) *Attorney, Agent, or Firm* — Nutter McClennen & Fish LLP

(57) ABSTRACT

A print control apparatus includes: a job reception unit that receives a print job in which a plurality of different print conditions are capable of being set; a setting reception unit that receives setting of a single print condition among the plurality of print conditions; a print execution unit that prints an image based on the print job as a result of executing the print job in accordance with a single print condition. The print execution unit, when the print condition set in the setting reception unit is changed during execution of the print job, prints an image based on the print job executed under the print condition subsequent to the change immediately after an image based on the print job executed under the print condition prior to the change.

13 Claims, 6 Drawing Sheets

FIG. 6

| PRINT MODE | INITIALIZATION REQUIRED? | RESERVATION |
|---|---|---|
| PRINT MODE M1 | REQUIRED | 1 |
| PRINT MODE M2 | NOT REQUIRED | — |
| PRINT MODE M3 | NOT REQUIRED | 3 |
| PRINT MODE M4 | REQUIRED | — |
| PRINT MODE M5 | REQUIRED | 2 |
| ... | ... | — |
| ... | ... | — |
| ... | ... | — |
| ... | ... | — |

FIG. 7

| PRINT MODE | NON-SELECTION DESIGNATION | PRIORITY LEVEL |
|---|---|---|
| PRINT MODE M1 | ☐ | 1 |
| PRINT MODE M2 | ☐ | 2 |
| PRINT MODE M3 | ☐ | 3 |
| PRINT MODE M4 | ☐ | 4 |
| PRINT MODE M5 | ☐ | 5 |
| ... | ☐ | 6 |
| ... | ☐ | 7 |
| ... | ☐ | 8 |
| ... | ☐ | 9 |

PRINT CONTROL APPARATUS AND METHOD FOR EXECUTING A PRINT JOB UNDER DIFFERENT PRINT CONDITIONS

BACKGROUND

1. Technical Field

The present invention relates to a printing technology for executing a print job on the basis of a predetermined print condition.

2. Related Art

To date, on the basis of a print job created by a computer or the like, a digital printing apparatus such as an inkjet printer or a laser printer prints an image by causing ink or toner to adhere to a recording medium. To enhance image quality, such a digital printing apparatus can perform a print job and print an image under a print condition corresponding to an image to be printed among a plurality of different print conditions. For example, in JP-A-2013-186374, a plurality of lookup tables (LUTs) that compensate for the output characteristics of a digital printing apparatus are prepared and an LUT corresponding to an image to be printed is selected and used for printing.

In some cases, however, a printed image is different from a desired one because the selected print condition is not appropriate. Hence, a user wants to compare images printed under different print conditions with one another.

SUMMARY

An advantage of some aspects of the invention is to provide a technique that allows a user to easily compare images printed under different print conditions with one another. The invention can be implemented as the following aspects.

According to a first aspect of the invention, a print control apparatus includes: a job reception unit that receives a print job in which a plurality of different print conditions are capable of being set; a print execution unit that prints an image based on the print job as a result of executing the print job in accordance with a set single print condition; and a print control unit that sets a single print condition among the plurality of print conditions in the print execution unit. The print execution unit, when the print condition set by the print control unit is changed during execution of the print job, prints an image based on the print job executed under the print condition subsequent to the change, immediately after an image based on the print job executed under the print condition prior to the change, by continuing the print job under the print condition subsequent to the change.

According to a second aspect of the invention, a printing method includes: receiving a print job in which a plurality of different print conditions are capable of being set; setting a single print condition among the plurality of print conditions; and printing an image based on the print job by executing the print job in accordance with the set print condition. When the set print condition is changed during execution of the print job, an image based on the print job executed under the print condition subsequent to the change is printed immediately after an image based on the print job executed under the print condition prior to the change, by continuing the print job under the print condition subsequent to the change.

In the aspects of the invention configured like this, the print job can be continued by changing the print condition during the execution of the print job. Hence, a user can confirm images printed under different print conditions by performing the print job by changing the print condition. Hence, a user can easily compare images printed under different print conditions.

The print control apparatus may be configured such that the print execution unit includes: a print head that performs printing; a data generation unit that generates drive data from the print job in accordance with the print condition set by the print control unit; a storage unit that stores the drive data generated by the data generation unit; and a head control unit that causes the print head to print an image corresponding to the drive data by driving the print head on a basis of the drive data read from the storage unit. This allows a user to confirm images printed under different print conditions by executing the print job while changing the print condition used when the drive data is generated from the print job.

The print control apparatus may be configured such that the print execution unit, in accordance with a change in the print condition set by the print control unit, when necessary for ensuring a region in the storage unit for storing the drive data generated under the print condition subsequent to the change, executes an initialization operation for initializing the storage unit storing the drive data generated under the print condition prior to the change. This allows the storage area of the storage unit to be released and allows the drive data generated under the print condition subsequent to the change to be stored in the storage unit.

The print control apparatus may be configured such that at the time described above the print control unit displays, on a user interface, a print condition, among the plurality of print conditions, that does not require the initialization operation for the change to the print condition. This allows a user to confirm an image printed under a different print condition while suppressing a loss in time due to the initialization operation by selecting a print condition that does not require the initialization operation.

The print control apparatus may be configured such that the print control unit displays, on a user interface, a print condition, among the plurality of print conditions, that requires the initialization operation for the change to the print condition together with content showing that the initialization operation is necessary. This allows a user to be notified that the initialization operation is required for changing the print condition.

The print control apparatus may be configured such that the print control unit receives, before a start of the print job, reservation for the change to the print condition, among the plurality of print conditions, that requires the initialization operation for the change to the print condition, and changes the print condition at a reserved timing during execution of the print job.

The print control apparatus may be configured such that at the time described above the print execution unit, in parallel with the execution of the print job, generates the drive data in accordance with the print condition subsequent to the change and stores the drive data in the storage unit in advance before the change to the reserved print condition. This allows generation of the drive data in accordance with the print condition subsequent to the change to be efficiently performed.

The print control apparatus may be configured such that the print control unit receives designation of a not-to-be-selected print condition among the plurality of print conditions.

The print control apparatus may be configured such that at the time described above the print control unit respectively attaches priority levels to the plurality of print conditions, and when a not-to-be-selected print condition is designated, the print condition having a highest priority level among non-designated print conditions is set in the print execution unit. This substantially allows a user to select and set print conditions by designating print conditions not to be selected.

The print control apparatus may be configured such that the print conditions are lookup tables used to convert the image data into the drive data; the print job includes image data expressing an image to be printed and the lookup tables; the print control unit sets one lookup table among the lookup tables included in the print job transmitted to the data generation unit; and the data generation unit converts the image data into the drive data in accordance with the lookup table set by the print control unit. This allows a user to execute the print job while changing the lookup table used for converting the image data into the drive data and confirm images printed by using different lookup tables.

The print control apparatus may be configured such that the print control unit is capable of adding the lookup table to the print job, after having transmitted the print job to the print execution unit. This allows a lookup table to be added to the already transmitted print job even after the transmission of the print job.

Note that not all of the plurality of configuration components included in the aspects of the invention are essential, and in order to solve some or all of the above-described problems, or in order to achieve some or all of the advantages described in the present specifications, some of the configuration components may be modified, deleted, replaced with other new configuration components, or some of the specific content may be deleted. Further, in order to solve some or all of the problems described above, or in order to realize some or all of the advantages described in the present specifications, a portion or all of the technological features included in one embodiment of the invention may be combined with a portion or all of the technological features included in another embodiment of the invention to realize an independent embodiment of the invention.

BRIEF DESCRIPTION OF THE DRAWINGS

The invention will be described with reference to the accompanying drawings, wherein like numbers reference like elements.

FIG. 6 is a diagram illustrating a first modification of the display manner of displaying a plurality of print modes.

FIG. 7 is a diagram illustrating a second modification of the display manner of displaying a plurality of print modes.

DESCRIPTION OF EXEMPLARY EMBODIMENTS

Figure 1:
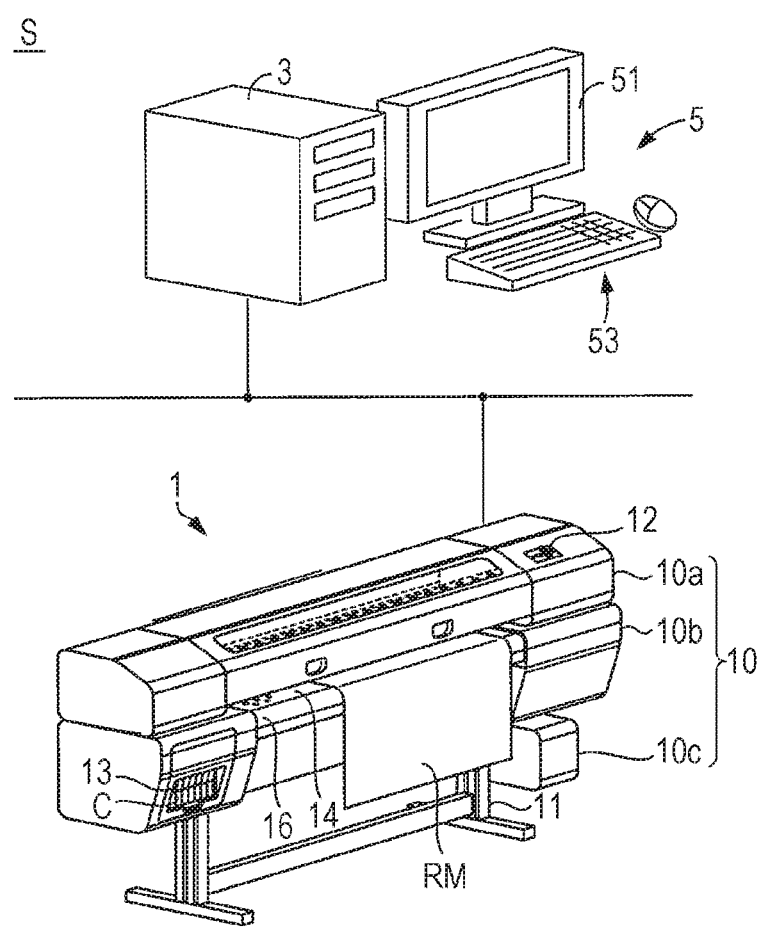
FIG. 1 is a diagram schematically illustrating a print control apparatus according to an example of the invention.

FIG. 1 is a diagram schematically illustrating a print control apparatus according to an example of the invention. As illustrated in FIG. 1, a print control apparatus S includes a printer 1, a computer 3 that controls the printer 1, and a user interface 5 connected to the computer 3. The user interface 5 includes a display 51 performing displaying for a user and an input device 53, formed of a keyboard and a mouse, that receives input operations from a user.

In the print control apparatus S, the printer 1 which is a digital printing apparatus, executes a print job J received from the computer 3, thereby ejecting liquid droplets (hereinafter called "ink droplets") composed of ink components (hereinafter, simply called "ink") to a recording medium RM. As a result, characters and images based on the print job J are printed on the recording medium RM. Note that the recording medium RM that can be used includes a resin film or the like other than paper such as a single large sheet, for example, a JIS-standard A1 sheet, a roll sheet having the same width as the single sheet, and the like.

The printer 1 includes a casing 10 formed of a combination of three types of box member, i.e., an upper box member 10a, a lower box member 10b, and a small box member 10c, and a leg portion 11 supporting the casing 10. The upper box member 10a and the lower box member 10b are stacked in the vertical direction. An operation panel 12 is provided on the front right side of the upper box member 10a. The operation panel 12 is formed of, for example, a touch panel display and has a function of displaying various messages and the like and a function of receiving input operations from a service man. A cartridge holder 13 housing an ink cartridge C containing ink is provided on the front left side of the lower box member 10b.

Although not illustrated, a spindle is horizontally provided in the rear portion (rear side in FIG. 1) of the lower box member 10b and a roll is mounted on the spindle. A long recording medium RM before printing is wound around this roll, and the recording medium RM can be drawn from the roll so as to be inserted between the upper box member 10a and the lower box member 10b. The printer 1 houses an inkjet print head 15 (FIG. 2) facing a suction platen 14 and ejects ink supplied from the ink cartridge C toward the recording medium RM from the print head 15 while supporting, by making use of suction of the suction platen 14, the recording medium RM drawn from the roll, whereby an image is printed on the recording medium RM. The recording medium RM on which printing has been performed is conveyed to the front of the printer 1 and hangs down due to self weight along a guide surface 16 provided at the front of the printer 1.

Figure 2:
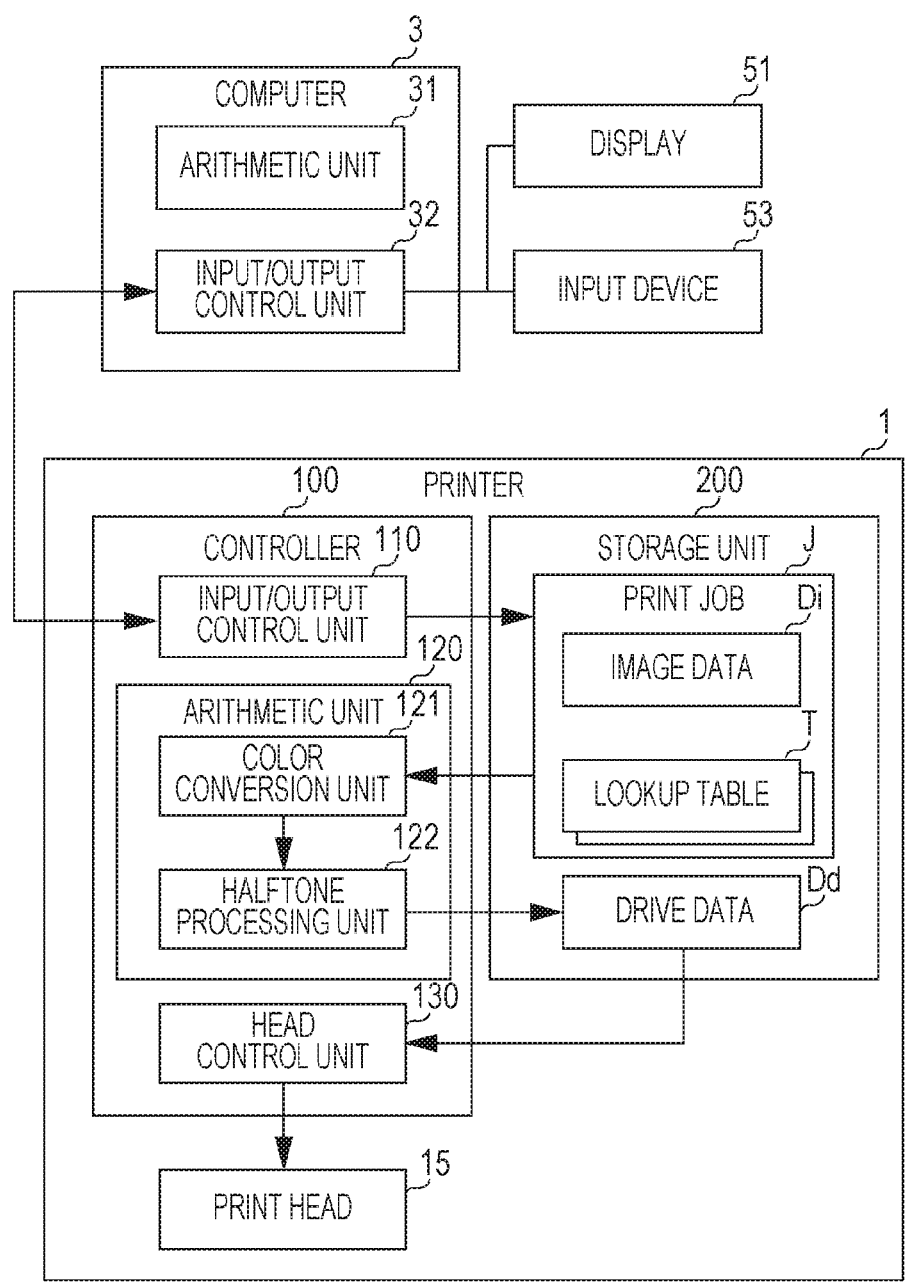
FIG. 2 is a block diagram illustrating an example of the electric configuration of the print control apparatus of FIG. 1.

FIG. 2 is a block diagram illustrating an example of the electric configuration of the print control apparatus of FIG. 1. Referring to FIG. 2, the computer 3 includes an arithmetic unit 31 formed of a central processing unit (CPU), random access memory (RAM), and the like and an input/output control unit 32 that controls input from and output to external apparatuses (the printer 1, the display 51, the input device 53, and the like). In the computer 3 described above, the arithmetic unit 31 creates the print job J and the input/output control unit 32 transmits the print job J to the printer 1. The print job J includes image data Di and a lookup table T. The image data Di generated by the arithmetic unit 31 is formed of three color components R, G, and B and expresses multi-gradation (256 gradations, for example) pixel values of each pixel. The lookup table T is a table referred to when three colors R, G, and B are converted into a plurality of colors printable by the printer 1, as disclosed in JP-A-2015-142312.

The printer 1 includes a controller 100 and a storage unit 200 formed of a hard disk drive (HDD) or a RAM. The controller 100 includes an input/output control unit 110 that controls input from and output to the input/output control unit 32 of the computer 3, an arithmetic unit 120 formed of a CPU, a RAM, and the like, and a head control unit 130 that controls the print head 15. The input/output control unit 110 stores the print job J received from the computer 3 in the storage unit 200. In association with this, the image data Di and the lookup table T of the print job J are loaded in the storage unit 200.

The arithmetic unit 120 functions as a color conversion unit 121 and a halftone processing unit 122 by executing predetermined programs. The color conversion unit 121 performs color conversion that entails conversion to a plurality of colors printable by the printer 1 for each of the pixels of the image data Di with reference to the lookup table T. Hence, when the colors printable by the printer 1 are four colors C, M, Y, and K, the image data Di after color conversion is formed of four color components C, M, Y, and K, and expresses the pixel value of each pixel as a multi-gradation value. The halftone processing unit 122 converts the pixel value of each pixel expressed as a multi-gradation value into a binary value, by performing halftone processing for the image data Di after color conversion. In this way, as a result of color conversion and halftone processing being applied to the image data Di, drive data Dd is generated from the image data Di and this drive data Dd is stored in the storage unit 200. Then as a result of the head control unit 130 driving the print head 15 on the basis of the drive data Dd read from the storage unit 200, ink is caused to be ejected from the print head 15. As a result, an image expressed by the image data Di included in the print job J is printed on the recording medium RM. In this way, the controller 100 executes the print job J stored in the storage unit 200, by generating the drive data Dd from the image data Di stored in the storage unit 200 and, further, driving the print head 15 on the basis of the drive data Dd.

Further, in the present embodiment, the print job J can be executed in a plurality of print modes where the lookup tables T used in color conversion are different from one another. A user, by making the printer 1 execute the print job J while changing the print mode, can confirm images printed in different print modes. Next, this point will be described in detail.

Figure 3:
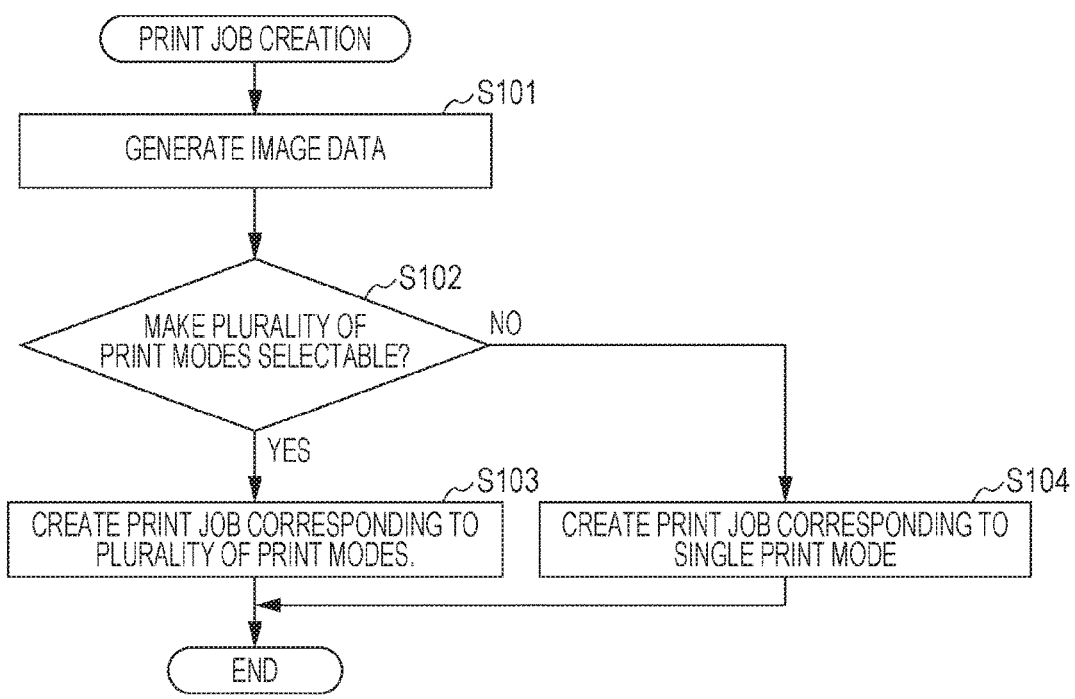
FIG. 3 is a flowchart illustrating exemplary steps of creating a print job performed by a computer.

FIG. 3 is a flowchart illustrating exemplary steps of creating a print job performed by a computer. In step S101, the arithmetic unit 31 generates the image data Di by using application software and the like. Further, a user, through operation of the input device 53, can choose a mode-changeable setting that allows a print mode used for executing a print job to be selected from a plurality of print modes. Hence, the arithmetic unit 31 determines whether or not the mode-changeable setting is effective (step S102). When the mode-changeable setting is effective (the case of "YES" in step S102), the arithmetic unit 31 creates a print job J including lookup tables T corresponding to the selectable plurality of print modes and the image data Di (step S103) and the flow of FIG. 3 ends. On the other hand, when the mode-changeable setting is invalid (the case of "NO" in step S102), the arithmetic unit 31 creates a print job J including a lookup table T corresponding to the single print mode set as a default and the image data Di (step S104), and the flow of FIG. 3 ends.

Figure 4:
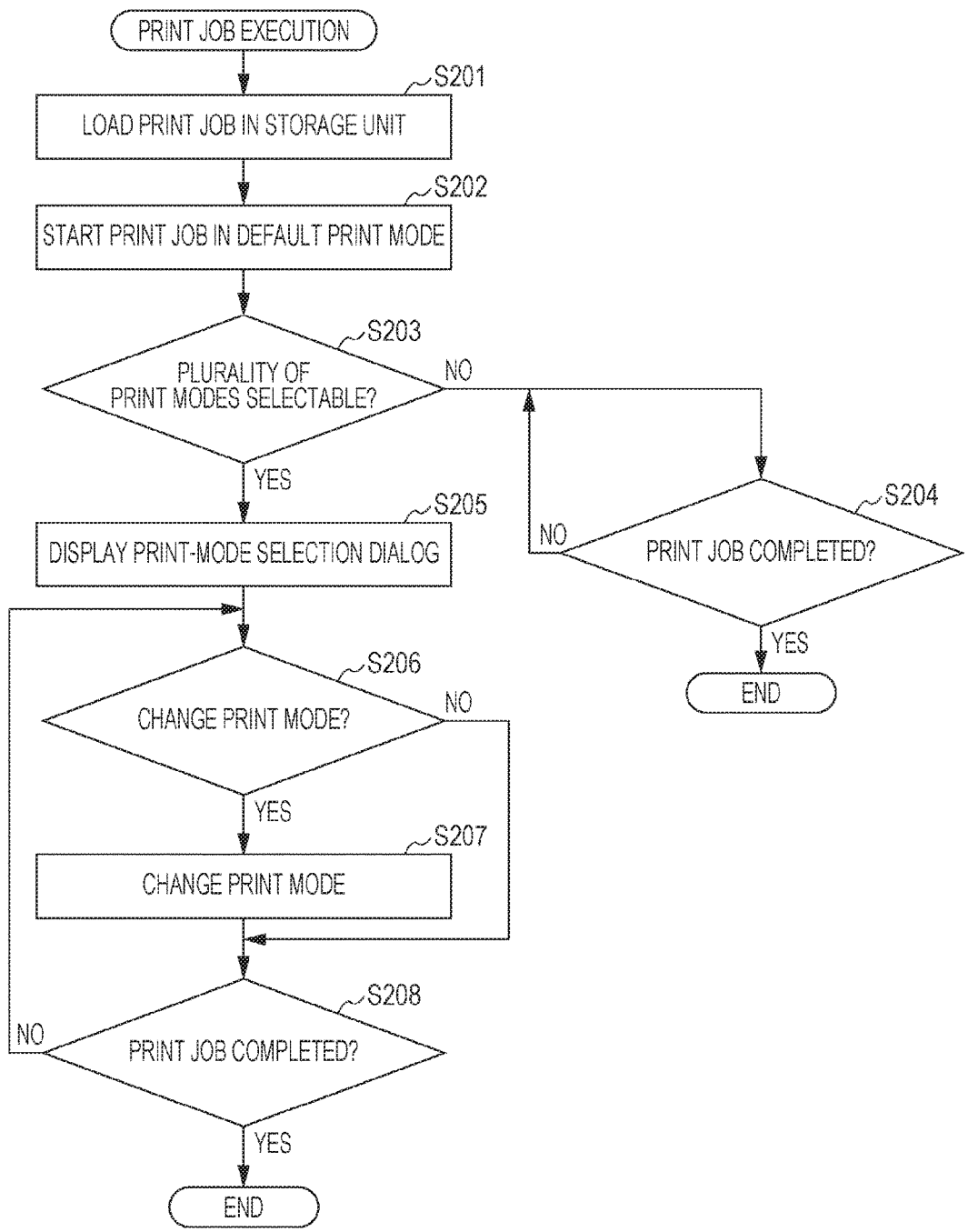
FIG. 4 is a flowchart illustrating exemplary steps of executing a print job performed by a printer.

FIG. 4 is a flowchart illustrating exemplary steps of executing a print job performed by a printer. The controller 100 loads the print job J received by the input/output control unit 110 in the storage unit 200 (step S201). The print job J includes a command that causes the controller 100 to set a default print mode, and the controller 100 starts the print job J in the default print mode set on the basis of the command (step S202). In accordance with this, the image data Di is subjected to color conversion by the lookup table T corresponding to the default print mode, the image data Di subsequent to color conversion is subjected to halftone processing and the drive data Dd is generated, and the print head 15 ejects ink in accordance with the drive data Dd.

Then, the controller 100 determines whether or not selection of a plurality of print modes is possible by confirming whether or not the print job J loaded in the storage unit 200 includes a plurality of the lookup tables T (step S203). In the case where the print job J includes only a single lookup table T and selection of a plurality of print modes is not possible (the case of "NO" in step S203), the controller 100 determines whether or not the print job J has been completed (step S204), while continuing the execution of the print job J in the default print mode. When the print job J has been completed (the case of "YES" in step S204), the flow of FIG. 4 ends.

Figure 5:
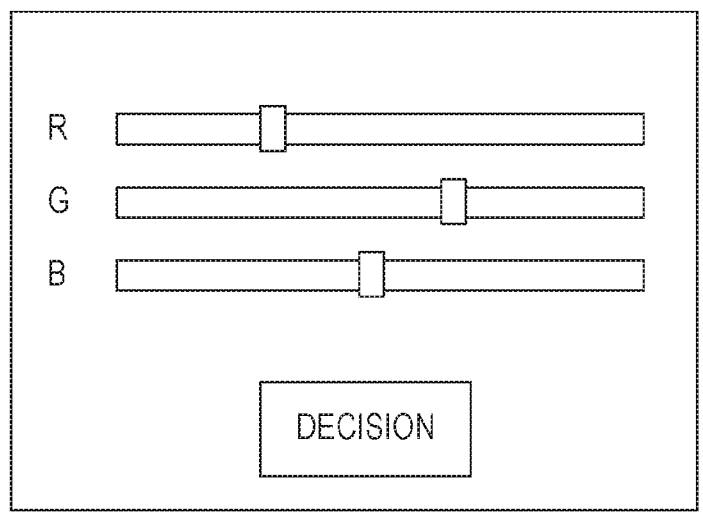
FIG. 5 is a diagram schematically illustrating an example of a print-mode selection dialog.

On the other hand, in the case where the print job J includes a plurality of the lookup tables T and selection of a plurality of print modes is possible (the case of "YES" in step S203), the controller 100 requests the computer 3 to display a print-mode selection dialog (FIG. 5), and the computer 3 displays it on the display 51 upon receipt of the request (step S205). Here, FIG. 5 is a diagram schematically illustrating an example of the print-mode selection dialog. This dialog is for changing the brightness of each of the colors R, G, and B. In other words, a user can adjust the brightness of the color corresponding to each knob by changing the position of the knob in the dialog, and further by selecting the decision button, the user can determine the brightness of each color displayed in the dialog through operation of the input device 53. The computer 3, selects the lookup table T most appropriate for reproducing the determined brightness of each color as an optimum lookup table T among a plurality of the lookup tables T, and transmits, to the printer 1, a command requesting the setting of a print mode corresponding to the most appropriate lookup table T.

The controller 100 which has received this command determines whether or not the print mode needs to be changed by checking whether or not the optimum lookup table T is the same as the lookup table T in use (step S206). In the case where the optimum lookup table T is not the same as the lookup table in use and, hence, the print mode needs to be changed (the case of "Yes" in step S206), the print mode is changed to a print mode corresponding to the optimum lookup table T (step S207), and the flow proceeds to step S208. In this way, as a result of step S207 being executed, a print mode corresponding to the optimum lookup table T is set in the controller 100. As a result, the image data Di is subjected to color conversion processing using the optimum lookup table T. The image data Di subsequent to color conversion is subjected to halftone processing, whereby the drive data Dd is generated and the print head 15 ejects ink in accordance with the drive data Dd. As a result of the print job J being continued using a print mode subsequent to the conversion in this way, an image based on the print job J executed in a print mode subsequent to the change is printed, immediately after an image based on the print job J executed in a print mode prior to the change.

On the other hand, in the case where the optimum lookup table T is the same as the one being used and the print mode need not be changed (the case of "NO" in step S206), the flow proceeds to step S208. Steps S206 to S208 are repeated until completion of the print job J is confirmed and when the completion of the print job J is confirmed ("YES" in step S208), the flow of FIG. 4 ends.

As described above, in the present embodiment, the lookup table T used when the drive data Dd is generated from the print job J is changed while the print job J is being executed and the print job J can be continued. Hence, a user can confirm an image printed using a different lookup table T by executing the print job J while changing the lookup table T. In this way, a user can easily compare images printed using different lookup tables T with one another.

As described above, in the present embodiment, the print control apparatus S corresponds to an example of the "print control apparatus" of the invention, the computer 3 corresponds to an example of the "print control unit" of the invention, the printer 1 corresponds to an example of the "print execution unit" of the invention, the input/output control unit 110 corresponds to an example of the "job reception unit" of the invention, the print head 15 corresponds to an example of the "print head" of the invention, the color conversion unit 121 and the halftone processing unit 122 function together as an example of the "data generation unit" of the invention, the storage unit 200 corresponds to an example of the "storage unit" of the invention, and the head control unit 130 corresponds to an example of the "head control unit" of the invention.

Note that the invention is not limited to the embodiment described above, and various modifications can be added to the embodiment described above within the scope of the invention. For example, the invention can be configured with various modifications described below.

In other words, color conversion and halftone processing of the image data Di are performed at a speed corresponding to the processing power of the arithmetic unit 120 and the generated drive data Dd is stored in the storage unit 200. Hence, at the time when it is determined in step S206 that the print mode has been changed, the drive data Dd generated in a print mode prior to having been changed is waiting to be used to drive the print head 15, in the storage unit 200. Among such pieces of drive data Dd waiting to be used, pieces of data used for driving the print head 15 during a period in which the drive data Dd is generated in the print mode subsequent to the change are necessary, but other pieces of the drive data Dd are not necessary. On the other hand, such unnecessary drive data Dd occupies the storage area of the storage unit 200 and, hence, it is thought that there is a case in which a storage area for the drive data Dd generated in a print mode subsequent to the change cannot be ensured in the storage unit 200.

Hence, in this modification, the controller 100 determines, on the basis of a percentage at which the storage unit 200 is being occupied by the drive data Dd prior to the change, whether or not it is necessary to ensure, in the storage unit 200, a storage area for storing the drive data Dd generated in a print mode subsequent to the change due to the change in a print mode set by the computer 3. When it is determined to be necessary, the controller 100 performs an initialization operation for initializing the storage unit 200 storing the drive data Dd generated by the print mode prior to the change. In particular, this initialization operation is performed for a region storing the drive data Dd that is not used for driving the print head 15 while the drive data Dd is generated in the print mode subsequent to the change, among the drive data Dd generated in the print mode prior to the change and stored in the storage unit 200. As a result, the memory region of the storage unit 200 is released and the drive data Dd generated in the print mode subsequent to the change can be stored in the storage unit 200.

In this connection, depending on the lookup table T, for example, there may be a case where the resolution at the color conversion is low compared with other lookup tables T, or a case where, although a different print mode is used, the recording characteristics of the media are similar and, hence, the lookup table is shared with part of the print modes and, consequently, the initialization operation is not required at the time of changing the lookup table. Hence, the computer 3 may display, on the display 51, a print mode in which the initialization operation is not required for changing to the print mode, among a plurality of print modes. Regarding the display manner at this time, for example, the corresponding print mode may be displayed in the form of a list instead of the dialog of FIG. 5. This will enable a user to confirm images printed in different print modes while suppressing loss of time associated with the initialization operation, by selecting a print mode that does not require the initialization operation.

Alternatively, the print mode may be displayed together with information on whether or not the initialization operation is required as in FIG. 6. FIG. 6 is a diagram illustrating a first modification of the display manner of displaying a plurality of print modes. In this modification, the computer 3 displays, on the display 51, print modes, among the plurality of print modes, that require an initialization operation for a change to the print modes, together with the content showing that an initialization operation is required. This allows a user to be notified that an initialization operation is required at the change of a print mode. Note that the display manner of displaying whether or not an initial operation is required is not limited to the present example, and may be, for example, a display manner based on the use of different colors.

Further, in this modification, a sequence in which a plurality of print modes are executed can be registered in advance and the print job J can be executed such that the print mode is changed at fixed intervals in accordance with the registered sequence. In other words, the computer 3 receives reservation for a change to a print mode, among the plurality of print modes, that requires an initial operation for a change to that print mode before the start of the print job J, and changes the print mode at a reserved timing during the execution of the print job J.

At this time, before change to a reserved print mode, the computer 3 generates in advance the drive data Dd in accordance with a print mode subsequent to the change and stores the drive data Dd in the storage unit 200, in parallel with execution of the print job J. For example, the computer 3 generates and stores in advance the drive data Dd in a print mode M5 with a reserved position of "2" in a queue, in parallel with execution of the print job J in a print mode M1 with a reserved position of "1" in a queue. This allows the drive data Dd to be efficiently generated in accordance with the print mode subsequent to the change.

FIG. 7 is a diagram illustrating a second modification of the display manner of displaying a plurality of print modes. In this modification, the computer 3 displays, on the display 51, receipt of designation of not-to-be-selected print modes among the plurality of print modes. In other words, a user can input, into the computer 3, an instruction stating that a print mode is not to be selected, by checking a corresponding non-selection check box through operation of the input device 53. Further, the computer 3 assigns priority levels to a plurality of print modes, and when a not-to-be-selected print mode is specified, the computer 3 instructs the printer 1 to set a print mode having the highest priority level among print modes not yet specified (i.e., print modes whose corresponding check boxes are not checked). This allows a user to substantially select and set a print mode by specifying print modes not to be selected.

Incidentally, in the embodiments described above, print modes corresponding to a plurality of the lookup tables T are included in the print job J and transmitted to the printer 1 from the computer 3. However, a configuration may be employed in which only a default print mode is included in the print job J at the time when the print job J is transmitted from the computer 3 to the printer 1, and when a user requested the change of a print mode, a print mode corresponding to a time subsequent to the change is transmitted from the computer 3 to the printer 1 and included in the print job J stored in the storage unit 200 of the printer 1. In this way, by employing a configuration in which the lookup table T can be added to the print job J within the printer 1 after the computer 3 has transmitted the print job J to the printer 1, the lookup table T can be added to the already transmitted print job J if necessary, even after the transmission of the print job J.

Note that in the embodiments described above, description has been made regarding the case in which the "print condition" of the invention is the lookup table T. However, the specific content of the "print condition" is not limited this, and may be a distance (gap) between the print head 15 and the recording medium RM facing the print head 15, a dither matrix used in halftone processing, an ICC profile, or the like.

The printer 1 forming part of the print control apparatus S is not limited to an inkjet printer described above, and may be a laser printer.

When images printed under different print conditions are to be compared with one another, a configuration may be employed in which a user can easily compare print images by lowering the print speed, for example, through changing two-way printing to one-way printing, and after the comparison is finished, the print speed may be changed to the original print speed upon receipt of the end of the comparison through an operation panel or the like. By employing this configuration, a user can easily compare printed images and when the comparison becomes no longer necessary, a state is entered at once in which printing can be performed at a print speed prior to slowing down.

In the embodiments described above, the printer 1 and the computer 3 are individually formed. However, the above-described functions realized by the computer 3 may be realized in the arithmetic unit 120 of the printer 1. In this case, the arithmetic unit 120 functions as an example of the "print control unit" of the invention.

What is claimed is:

1. A print control apparatus comprising:
   a job receiver that receives a single print job comprising image data and print mode data that is associated with a plurality of different print conditions capable of being set during execution of the single print job, wherein the plurality of different print conditions includes one or more of a lookup table, a distance between a print head and a recording medium, a dither matrix, and an International Color Consortium (ICC) profile;
   a print executer including the print head for printing an image by ejecting ink to execute the single print job based on the image data in accordance with a first print condition; and
   a print controller that sets the first print condition among the plurality of print conditions in the print executer, wherein, the print controller determines whether the print mode data included in the single print job is associated with more than one print condition and displays a user interface configured to receive a user selection of a second print condition from among the plurality of different print conditions to set during execution of the single print job in response to determining that the print mode data included in the single print job is associated with more than one print condition;
   when the first print condition of the single print job set by the print controller is changed to the second print condition among the plurality of different print conditions while executing the single print job, the print executer continues to execute the single print job to print the image in accordance with the second print condition.

2. The print control apparatus of claim 1, wherein the print executer includes: a data generator that generates drive data from the single print job in accordance with a print condition set by the print controller; a storage that stores the drive data generated by the data generator; and a head controller that causes the print head to print the image corresponding to the drive data by driving the print head on a basis of the drive data read from the storage.

3. The print control apparatus of claim 2, wherein the print executer, in accordance with a change in the print condition set by the print controller, when necessary for ensuring a region in the storage for storing the drive data generated under the print condition subsequent to the change, executes an initialization operation for initializing the storage storing the drive data generated under the print condition prior to the change.

4. The print control apparatus of claim 3, wherein the print controller displays, on a user interface, a print condition, among the plurality of print conditions, that does not require the initialization operation for the change to the print condition.

5. The print control apparatus of claim 3, wherein the print controller displays, on a user interface, a print condition, among the plurality of print conditions, that requires the initialization operation for the change to the print condition together with content showing that the initialization operation is necessary.

6. The print control apparatus of claim 3, wherein the print controller receives, before a start of the print job, reservation for the change to the print condition, among the plurality of print conditions, that requires the initialization operation for the change to the print condition, and changes the print condition at a reserved timing during execution of the print job.

7. The print control apparatus of claim 6, wherein the print executer, in parallel with the execution of the print job, generates the drive data in accordance with the print condition subsequent to the change and stores the drive data in the storage unit in advance before the change to the reserved print condition.

8. The print control apparatus of claim 3, wherein the print controller receives designation of a not-to-be-selected print condition among the plurality of print conditions.

9. The print control apparatus of claim 8, wherein the print controller respectively attaches priority levels to the plurality of print conditions, and when a not-to-be-selected print condition is designated, the print condition having a highest priority level among non-designated print conditions is set in the print executer.

10. The print control apparatus of claim 2,
    wherein the print conditions are lookup tables used to convert the image data into the drive data, wherein the print job includes image data expressing an image to be printed and the lookup tables, wherein the print controller sets one lookup table among the lookup tables included in the print job transmitted to the data generator, and wherein the data generator converts the image data into the drive data in accordance with the lookup table set by the print controller.

11. The print control apparatus of claim 10, wherein the print controller is capable of adding the lookup table to the print job, after having transmitted the print job to the print executer.

12. The print control apparatus of claim 1, wherein the print executer executes the single print job by printing a first image according to the first print condition and a second image according to the second print condition that is different from the first print condition continuously in the single print job.

13. A printing method comprising:

receiving a single print job comprising image data and print mode data associated with a plurality of different print conditions capable of being set during execution of the single print job, wherein the plurality of different print conditions includes one or more of a lookup table, a distance between a print head and a recording medium, a dither matrix, and an International Color Consortium (ICC) profile;

setting a first print condition among the plurality of print conditions for executing the single print job;

executing the single print job to print an image based on the image data in accordance with the first print condition, wherein the print job is executed by ejecting ink from a print head;

determining whether the print mode data included in the single print job is associated with more than one print condition;

displaying a user interface configured to receive a user selection of a second print condition from among the plurality of different print conditions to set during execution of the single print job in response to determining that the print mode data included in the single print job is associated with more than one print condition; and when the first print condition of the single print job is changed to the second print condition among the plurality of different print conditions while executing the single print job, continuing to execute the single print job to print the image in accordance with the second print condition.

* * * * *